United States Patent
Cano Cediel et al.

(10) Patent No.: US 9,782,958 B2
(45) Date of Patent: Oct. 10, 2017

(54) METHOD AND DEVICE FOR MANUFACTURING COMPOSITE MATERIAL PARTS

(71) Applicant: AIRBUS OPERATIONS, S.L., Getafe, Madrid (ES)

(72) Inventors: David Cano Cediel, Madrid (ES); Ruth Chinarro Vera, Madrid (ES); Francisco Escobar Benavides, Madrid (ES); Pedro Nogueroles Viñes, Madrid (ES)

(73) Assignee: Airbus Operations S.L., Madrid (ES)

( * ) Notice: Subject to any disclaimer, the term of this patent is extended or adjusted under 35 U.S.C. 154(b) by 316 days.

(21) Appl. No.: 14/388,555

(22) PCT Filed: Mar. 22, 2013

(86) PCT No.: PCT/ES2013/070190
§ 371 (c)(1),
(2) Date: Sep. 26, 2014

(87) PCT Pub. No.: WO2013/144404
PCT Pub. Date: Oct. 3, 2013

(65) Prior Publication Data
US 2015/0053332 A1 Feb. 26, 2015

(30) Foreign Application Priority Data
Mar. 26, 2012 (ES) .................. 201230446

(51) Int. Cl.
*B29C 70/28* (2006.01)
*B29C 51/08* (2006.01)
(Continued)

(52) U.S. Cl.
CPC ........ *B32B 37/0046* (2013.01); *B29C 70/386* (2013.01); *B29D 99/0003* (2013.01);
(Continued)

(58) Field of Classification Search
CPC .............. B29C 70/386; B32B 37/0046; B32B 2305/72; B32B 2605/18
(Continued)

(56) References Cited

U.S. PATENT DOCUMENTS

| 5,238,640 A | 8/1993 | Masui et al. |
| 7,130,714 B1 * | 10/2006 | Kulkarni ................ B21D 22/10 |
| | | 700/165 |

(Continued)

FOREIGN PATENT DOCUMENTS

| EP | 1609584 | 12/2005 |
| EP | 2206598 | 7/2010 |

(Continued)

OTHER PUBLICATIONS

International Search Report for PCT/ES2013/070190, mailed Aug. 23, 2013, 3 pages.

*Primary Examiner* — Joseph S Del Sole
*Assistant Examiner* — Thukhanh T Nguyen
(74) *Attorney, Agent, or Firm* — Nixon & Vanderhye P.C.

(57) ABSTRACT

The manufacturing method object of the invention comprises the following stages: A) stacking strips of prepreg material on a laminating tool (14), so that an angled laminated part (2) is obtained comprising a central section (2a) contained in a first plane (12), at least one side section (2b) contained in a second plane (13), and at least one bending axis (5) between the central section (2a) and the at least one side section (2b), so that, the first plane and the second plane form an angle α; B) forming of the angled laminated part (2) comprising bending along the bending axis (5) the, at least, one side section with respect to the central section (2a), obtaining a formed part (6); C) curing, of the formed part (6).

5 Claims, 3 Drawing Sheets

(51) Int. Cl.
*B32B 37/00* (2006.01)
*B29C 70/38* (2006.01)
*B29D 99/00* (2010.01)
*B32B 37/16* (2006.01)
*B32B 38/00* (2006.01)
*B29L 31/00* (2006.01)
*B29C 33/30* (2006.01)

(52) U.S. Cl.
CPC .......... *B32B 37/16* (2013.01); *B32B 38/0012* (2013.01); *B29C 33/308* (2013.01); *B29L 2031/001* (2013.01); *B32B 2305/076* (2013.01); *B32B 2305/72* (2013.01); *B32B 2309/06* (2013.01); *B32B 2605/18* (2013.01); *Y10T 156/1044* (2015.01)

(58) Field of Classification Search
USPC .................................. 425/329, 330, 385, 416
See application file for complete search history.

(56) References Cited

U.S. PATENT DOCUMENTS

| | | | |
|---|---|---|---|
| 7,213,437 B2* | 5/2007 | Osumi | B21D 5/00 |
| | | | 72/379.2 |
| 8,142,181 B2* | 3/2012 | Willden | B29C 43/12 |
| | | | 425/416 |
| 2005/0023728 A1 | 2/2005 | Benson et al. | |
| 2006/0249883 A1* | 11/2006 | Oguma | B29C 70/44 |
| | | | 264/339 |
| 2007/0289699 A1 | 12/2007 | Benson et al. | |
| 2011/0097554 A1 | 4/2011 | Kehrl et al. | |

FOREIGN PATENT DOCUMENTS

| | | |
|---|---|---|
| EP | 2248785 | 11/2010 |
| EP | 2261006 | 12/2010 |
| FR | 2 850 368 | 7/2004 |
| GB | 2243104 | 10/1991 |
| GB | 2244453 | 12/1991 |

* cited by examiner

METHOD AND DEVICE FOR MANUFACTURING COMPOSITE MATERIAL PARTS

This application is the U.S. national phase of International Application No. PCT/ES2013/070190, filed 22 Mar. 2013, which designated the U.S. and claims priority to ES Application No. P201230446, filed 26 Mar. 2012, the entire contents of each of which are hereby incorporated by reference.

OBJECT OF THE INVENTION

The present invention is related to a method for manufacturing parts made of composite material of big thickness and/or complex geometry. Parts with these large angle geometries and/or big thicknesses can be manufactured using the manufacturing method object of the invention, complying with the quality standards (dimensional and structural) required for parts used in the aeronautical industry. The method comprises laminating and forming, using the ATL (Automatic Tape Laying) technology for laminating. It is applicable in the field of part manufacturing for the aeronautical industry.

Technical Problem to be Solved and Background of the Invention

The use of composite materials in part manufacturing for the aeronautical industry has been extended due to the properties of lightness, durability and resistance of said materials.

One of the techniques currently used for the manufacturing of composite material parts consists of laying up strips of prepreg material on a lamination table (laminating process), until obtaining a flat laminated part that is subjected to a subsequent forming, obtaining the geometry of the desired part from the originally flat laminated part, and finally curing the part with the definitive geometry.

ATL technology, traditionally, is used for laminating flat parts or, in their absence, parts with very small curvature, using strips of prepreg material that are laid on a flat surface. Traditionally, for laminating parts which are too curved, FP (Fiber Placement) technology is used.

The traditional manufacturing method of composite material parts, using ATL technology, comprises the following steps:

A) stacking of the prepreg material strips on a flat surface,
B) forming of the part laminated in the previous step through the use of:
  a.—a male tool, with the internal geometry of the desired part, the laminated part being pressed against said male tool until obtaining the desired geometry,
  b.—a forming machine with a membrane of elastomer material, and
  c.—temperature of around 60° C. and application of vacuum at low speed to pressure-bend the laminate against the male tool.
C) curing the part obtained in the previous step, in an autoclave in which high pressure and temperature are applied.

The heat in the forming step is applied by means well known in the state of the art, which are embedded in the upper part of the forming machine.

This manufacturing method has the problem that when bending angles of approximately 90° in parts of big thickness, problems arise due to the fact that the carbon fibre is inextensible, which is why, in the bending area, there is a sliding between the different layers of prepreg material, which may not be sufficient to allow a coupling of some layers over others creating wrinkles.

These wrinkles are the reason why parts manufactured according to this traditional method do not comply with the quality requirements in the manufacturing of parts for aircraft.

In addition, the overheating of some layers of said material occurs during the forming in laminated parts of big thickness. This is because the heat is supplied from the top part of the forming machine and for the layers located further away from the heat source (closest to the male tool) to acquire the required temperature for bending, the layer closest to said heat source is subjected to a very high temperature, causing a reduction of the lifespan of the composite material.

The object of this invention is to find a method for manufacturing composite material parts with complex geometries and formed from laminates of big thickness, using ATL technology in the laminating stage, such that the parts manufactured with this method comply with the quality standards required by aircraft parts.

DESCRIPTION OF THE INVENTION

The invention discloses a method for manufacturing parts made of composite material from strips of prepreg material.

The manufacturing method object of the invention comprises the following stages:

A) stacking of the prepreg material strips, on a laminating tool, so that a laminated part is obtained, comprising:
  a central section, contained in a first plane,
  at least one side section, contained in a second plane, and
  at least one bending axis between the central section and the, at least, one side section;
so that the first plane and the second plane form an angle $\alpha$;
B) forming the laminated part by bending along the, at least one bending axis, the at least one side section with respect to the central section, obtaining a formed part;
C) curing the formed part.

In the manufacturing method object of the invention, the stacking is carried out on a laminating tool comprising a male tool, on which the central section of the laminated part is laid up, and at least one detachable part on which the at least one side section is laid up In the manufacturing method object of the invention, the forming is carried out on the male tool, by removing the at least one detachable part, and by folding the at least one side section, along the at least one bending axis.

The invention also discloses a device for carrying out the laminating that is part of the manufacturing process object of the invention:

a male tool having a top surface,
at least one detachable part with a top surface, The top surface of the at least one detachable part is an extension of the top surface of the male tool; therefore the device provides a continuous top laminating surface.

In said device, the top surface of the central section is contained in a first plane and the top surface of the at least one detachable part is contained in a second plane, so that the first plane and the second plane form an angle $\alpha$.

The angle $\alpha$ is up to 25°, this range being limited by the rotation capacity of the laminating machine.

DESCRIPTION OF THE FIGURES

To complete the description and with the object of helping towards a better understanding of the features of the device, this specification is accompanied by a set of figures where, with illustrative character and without limitation, the following has been represented.

A list of the different elements that integrate the invention shown in the figures is given hereinafter:
1.—table,
2.—angled laminated part,
2.a. a central section of the curved laminated part,
2.b. side section of the curved laminated part,
3.—membrane,
4.—detachable parts,
5.—bending axis,
6.—formed part,
7.—top surface,
7c.—top surface of the male tool,
7p.—top surface of the detachable part,
8.—male tool,
9.—top of the forming machine,
10.—finished part,
11.—bench,
12.—first plane,
13.—second plane,
14.—laminating tool,
15.—flat laminated part.

DETAILED DESCRIPTION OF THE INVENTION

The object of this invention is a method for manufacturing parts made of composite material, where the creation of wrinkles is minimized, by carrying out a laminating process on a surface which is not flat in order to perform a first placement of the prepreg material fibres that makes their subsequent bending easier. With this new manufacturing method, parts made of composite material that meet the quality standards of the parts used in the aeronautical industry are obtained.

FIG. 1 shows in a schematic way the laminating and forming steps of the manufacturing method currently used in the manufacturing of parts made of composite material. The last step is the curing of the part, which is not shown in any of the figures. The resulting finished part (10) is a "U"-shaped part, but this method is not limited to this geometry, as different geometries can be manufactured using it.

Figure 1A:
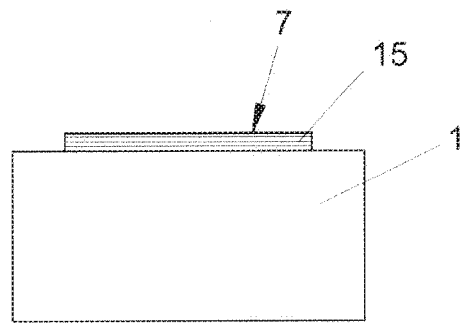
FIG. 1 (1A, 1B, 1C) represents in a schematic way the method for manufacturing parts of composite material that is currently used.

FIG. 1A shows the flat laminated part (15) obtained by means of stacking strips of prepreg material on a table (1) with a flat top surface (7).

Figure 1B:
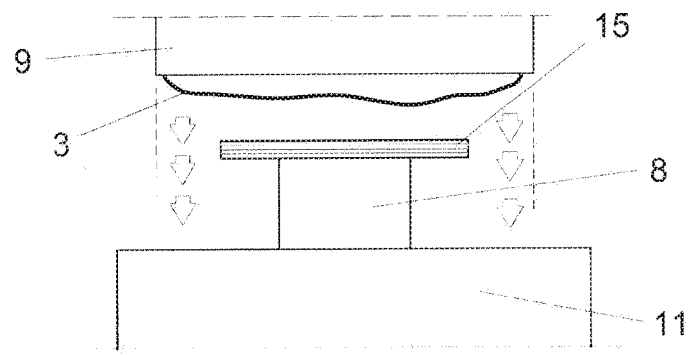

FIG. 1B shows the positioning of the flat laminated part (15) on the forming male tool (8) inside the forming machine. Once the flat laminated part (15) is placed on the forming male tool (8) below the top part of the forming machine (9), there is a membrane (3) that moves downwards, along with the top part of the forming machine (9), up to the point where the ends of the membrane (3) come into contact with the bench (11). Heat is applied throughout the top part of the forming machine in order to carry out the forming of the part, and vacuum is also applied by means of the membrane, so that the part conforms to the male tool (8), thus obtaining the geometry of the finished part.

Figure 1C:
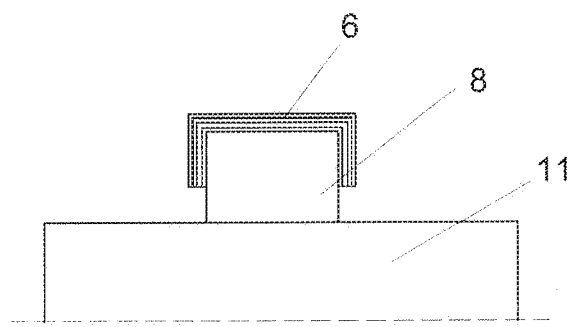

FIG. 1C shows the formed part (6) located on the male tool (8) waiting to be transferred to be cured.

This manufacturing method has the previously described problem for parts of big thickness and/or with geometries with big angles which is the creation of wrinkles in the material making up the part in the areas in which the folds are produced. Another problem of this method for parts of big thickness is the loss of properties of the material in areas that are subjected to excessive temperatures during forming.

Figure 2:
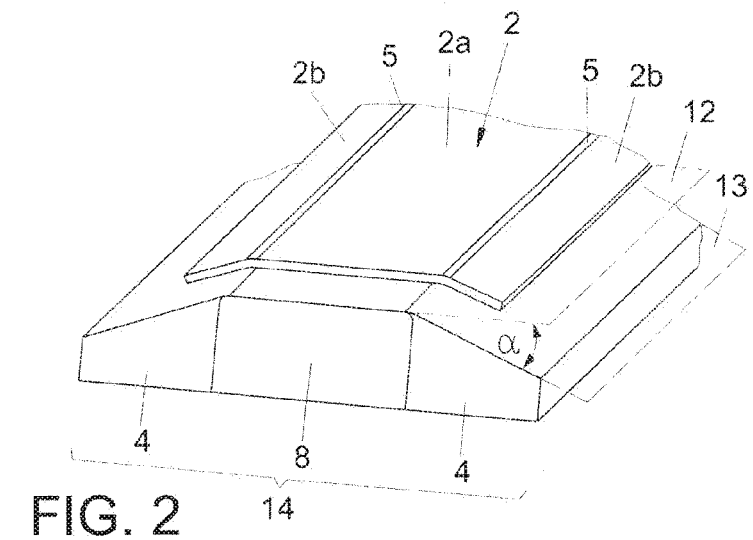
FIG. 2 shows the laminating tool used in the manufacturing method of the invention during the laminating of the part, consisting of the male tool of the subsequent forming and two detachable parts.
Figure 3:
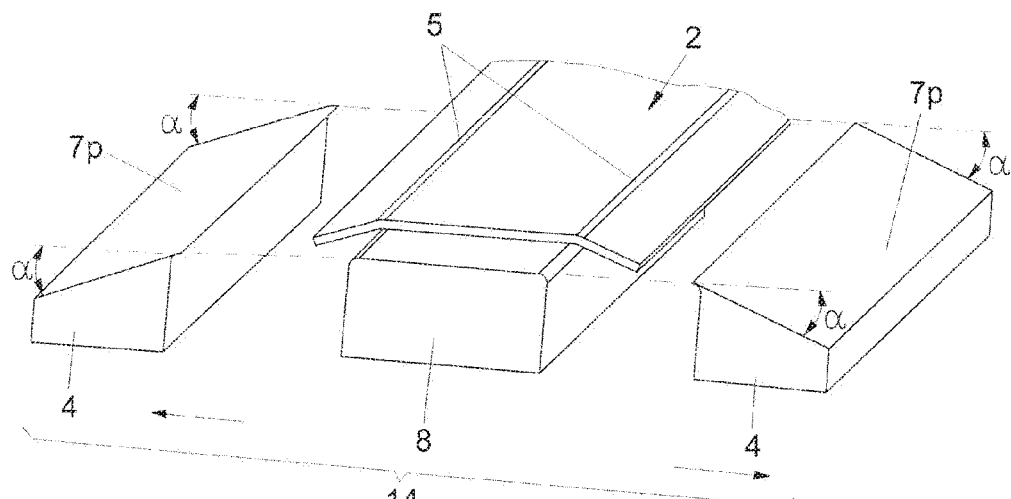
FIG. 3 shows a view of the intermediate step between laminating and forming, at the moment in which the detachable parts are being removed.
Figure 4:
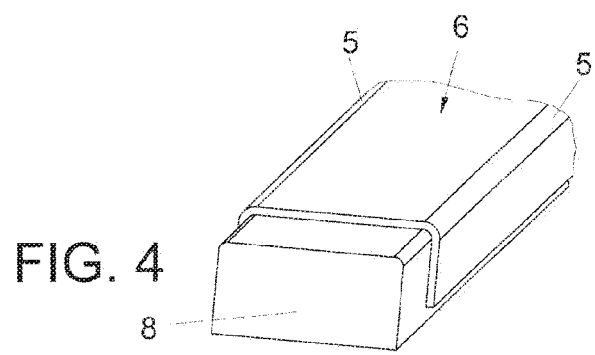
FIG. 4 shows the manufactured part placed on the male tool, when the forming has been carried out.

FIGS. 2, 3 and 4 show different steps of a preferred embodiment of the manufacturing method object of the invention. In this preferred embodiment of the manufacturing method, the finished part (10) obtained is a "U"-shaped part (shown in FIG. 6).

The first step of the manufacturing method object of the invention according to the preferred embodiment, consists of the stacking of the prepreg material strips on a laminating tool (14), which is made up by the forming male tool (8) which has the shape of the finished part (10) intended to be manufactured, and at both sides of the aforementioned male tool (8), detachable parts (4) are located, with the feature that the top surface (7p) of the detachable parts (4) forms an angle α with the top surface (7c) of the male tool (8). The top surface (7c) of the male tool (8) and the top surface (7p) of the detachable parts (4) form a continuous top surface (7) on which the laminating is carried out. The angle α is limited by the rotation capacity of the laminating machine being used (see FIG. 5).

The transition between the top surface (7c) of the male tool (8) and the top surface (7p) of the detachable parts (4) located on the sides of the male tool (8) is a transition such that the laminating machine does not find any gap when performing the laminating. In an embodiment of the device used in the manufacturing method object of the invention, the corners of the male tool (8) have a rounded shape and the detachable parts (4) have a shape that, in the common area with the male tool (8), fit with the rounded shape of the corners of the aforementioned male tool (8).

FIG. 2 shows a view of the angled laminated part (2), where the following can be distinguished:
a central section (2a), contained in a first plane (12),
two side sections (2b), contained in second planes (13), and
bending axes (5) between the central section (2a) and the side sections (2b).

In this angled laminated part (2), the first plane (12) and the second plane (13) form an angle α, so that, during the stacking process, an angled laminated part (2) that is not flat is obtained.

The next step of the manufacturing method object of the invention is to perform the forming of the angled laminated part (2). In this step the side sections (2b) of the angled laminated part (2) are folded with respect to the central section (2a) until obtaining the final shape of the part intended to be manufactured. In order to carry out the forming, the detachable parts (4) are removed (FIG. 3 shows the removal of said detachable parts (4)) and only the male tool (8) on which the forming is carried out with the forming machine (9) as it is carried out in the method known in the state of the art, is left, as shown in FIG. 1B.

FIG. 4 shows the formed part (6), located on the forming male tool (8), waiting to the last step of the manufacturing method, this last step is the curing of the part, which is carried out in a similar way as it is carried out in the method known in the state of the art.

Figure 5:
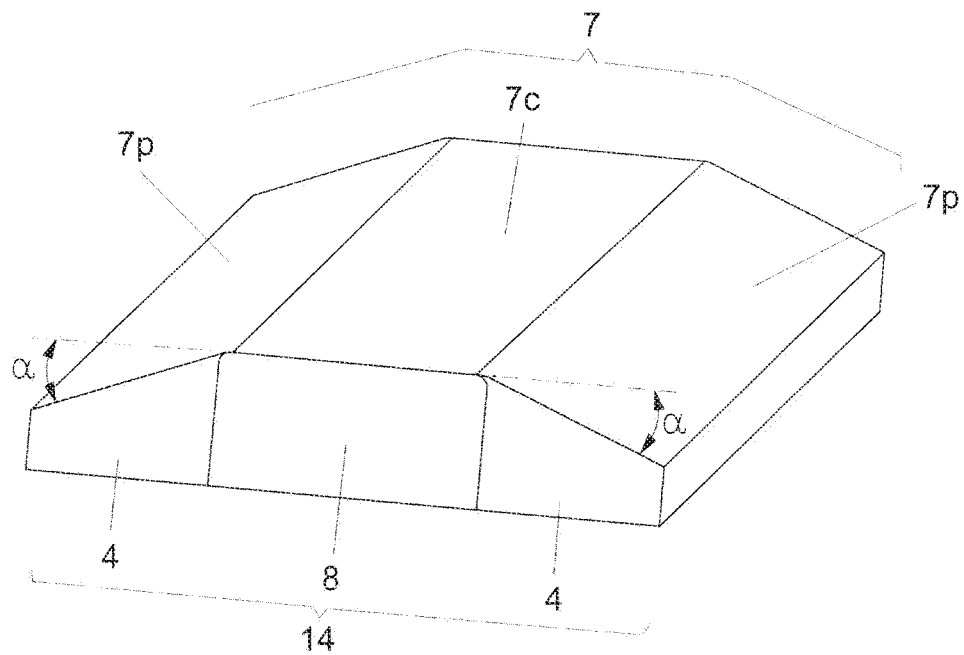
FIG. 5 shows the tool used in the manufacture of the part.
Figure 6:
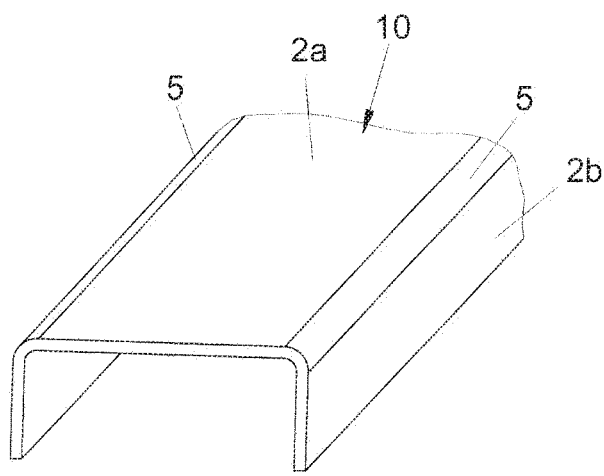
FIG. 6 shows a finished part obtained with the manufacturing method object of the invention, according to the preferred embodiment of the invention.

FIG. 5 shows the laminating tool (14) used in the laminating that is used in the manufacturing method object of the invention. In a preferred embodiment of the invention, said laminating tool (14) comprises:
- a male tool (8) which will be used in the subsequent forming, and
- two detachable parts (4), FIG. 6 shows the finished part (10) made with the manufacturing method object of the invention. The bending axes (5), which have allowed carrying out the forming in the manufacturing method without the creation of wrinkles that appeared on the manufacturing method of the state of the art, are marked on the finished part (10).

The manufacturing method object of the invention has advantages over the manufacturing method currently used:
- ease of bending during the forming, since, during the laminating, the bending axes (5) on which the prepreg material fibres have been placed are marked such that in the subsequent forming the possible appearance of wrinkles is minimized. The greater the angle α, the more marked the bending axes (5) are, so that in the bending carried out in the subsequent forming, the risk of having wrinkles is reduced.
- the temperature that the top fibres have to withstand in the forming of the angled laminated part (2) is lower than the temperature they withstand in the currently used method. Since there is a first bending, the temperature at which the fibres of the angled laminated part (2) located further away from the heat source bend is below the temperature required in the method currently used and the time of application of said heat decreases.
- the implementation of the laminating and forming steps in the same physical location, without having to move the part from the laminating tool (1) to a forming tool reduces the possibility of errors or problems, which occur during said transfer.

The invention should not be limited to the particular embodiment described in this document. The persons skilled in the art can develop other embodiments in view of the description made here. As a result, the scope of the invention is defined by the following claims.

The invention claimed is:

1. An apparatus for carrying out lamination of parts of composite material from strips of preimpregnated material (prepreg), the apparatus comprises:
   a male tool having a top surface and two top corners at the edges of the top surface, wherein at least one of the top corners is a rounded top corner and extends from the top surface to a side of the male tool; and
   at least one detachable part with a top surface, wherein, while the at least one detachable part is adjacent the male tool, the top surface of the at least one detachable part is an extension of the top surface of the male tool providing a continuous top laminating surface,
   wherein a side of the at least one detachable part includes a concave surface immediately below the top surface which is configured to face the rounded top corner of the male tool; and
   wherein the top surface of the male tool is contained in a first plane and the top surface of the at least one detachable part is contained in a second plane, and the first plane and the second plane form an angle α which is not zero.

2. The apparatus according to claim 1, wherein the angle α is between 20° and 30°.

3. An apparatus comprising:
   a male tool including an upper surface, a side surface adjacent the upper surface, and a rounded corner surface between the upper surface and the side surface, wherein the upper, rounded corner and side surfaces are configured to support a laminated part;
   a detachable part including an upper surface and a side surface adjacent the upper surface of the detachable part, wherein the upper surface of the detachable part forms an angle α which not zero and the side surface includes a concave surface adjacent an edge of the upper surface of the detachable part;
   wherein concave surface of the side surface of the detachable part is configured to abut against the rounded corner of the male tool and the edge of the upper surface of the detachable part is configured to overlap the rounded corner of the male tool such that the upper surfaces of the detachable part and the male tool form a continuous upper surface configured to support the laminated part.

4. The apparatus of claim 3 wherein the edge of the upper surface of the detachable part extends beyond the side surface of the detachable part.

5. The apparatus of claim 3 further comprising a second detachable part including a second upper surface and a second side surface adjacent the second upper surface, wherein the second side surface is configured to abut against a second side surface of the male tool and an edge of the second upper surface of the detachable part is configured to align with a second edge of the upper surface of the male tool such that the second upper surface is included in the continuous upper surface configured to support the laminated part.

* * * * *